United States Patent [19]

Guillard et al.

[11] Patent Number: 5,203,900
[45] Date of Patent: Apr. 20, 1993

[54] METHOD OF PRODUCING DISCONTINUOUS COATED GLASS FIBERS

[75] Inventors: Christian Guillard, Vincennes; Bernard Gicquel, Saint Brice Sous Foret; Guy Berthier, Clermont, all of France

[73] Assignee: Isover Saint-Gobain. "Les Miroirs", Courbevoie, France

[21] Appl. No.: 927,787

[22] Filed: Aug. 10, 1992

Related U.S. Application Data

[63] Continuation of Ser. No. 622,902, Dec. 6, 1990, abandoned.

[30] Foreign Application Priority Data

Dec. 6, 1989 [FR] France .................. 89 16093

[51] Int. Cl.$^5$ .................. C03C 25/02; C03B 37/04
[52] U.S. Cl. .......................... 65/3.44; 65/6; 428/228; 428/364; 428/378
[58] Field of Search ............ 65/3.1, 3.4, 3.44, 6; 428/228, 364, 378

[56] References Cited

U.S. PATENT DOCUMENTS

| | | | |
|---|---|---|---|
| 2,706,377 | 4/1955 | Slayter | 57/140 |
| 2,949,632 | 8/1960 | Kleist et al. | |
| 3,020,586 | 2/1962 | Charpentier et al. | |
| 3,066,383 | 12/1962 | Marzocchi et al. | 28/80 |
| 3,077,751 | 2/1963 | Snow et al. | 65/3.44 X |
| 3,304,164 | 2/1967 | Charpentier et al. | 65/14 |
| 3,523,774 | 8/1970 | Kleist | 65/14 |
| 3,669,638 | 6/1972 | Wong et al. | 65/3 |
| 3,823,219 | 7/1974 | Ward, Jr. et al. | 264/331 |
| 4,284,538 | 8/1981 | Graham | 65/3.44 X |
| 4,433,535 | 2/1984 | Darrichard et al. | 57/229 |
| 4,461,804 | 7/1984 | Motsinger et al. | 65/3.44 X |
| 4,555,447 | 11/1985 | Sieloff et al. | 65/3.44 X |
| 4,584,110 | 4/1986 | Rammel | 252/8.8 |

FOREIGN PATENT DOCUMENTS

| | | | |
|---|---|---|---|
| 52-77294 | 6/1977 | Japan | 65/3.44 |
| 948863 | 2/1964 | United Kingdom | 65/3.44 |

Primary Examiner—Robert L. Lindsay
Attorney, Agent, or Firm—Pennie & Edmonds

[57] ABSTRACT

Discontinuous fibers are manufactured from a thermoplastic material having an elevated melting point by feeding molten thermoplastic material into a centrifugal chamber. The chamber includes a plurality of orifices through which the molten thermoplastic material is forced, thereby forming molten thermoplastic jets. Hot streams of gas are directed at these jets to convert the jets into thermoplastic fibers. Sizing agents including an emulsion or suspension in water, or an aqueous solution of active substances is sprayed onto the fibers. These sizing agents comprise no more than three active substances including a lubricating agent and an antistatic agent.

10 Claims, 1 Drawing Sheet

METHOD OF PRODUCING DISCONTINUOUS COATED GLASS FIBERS

This is a continuation of application Ser. No. 07/622,902 filed Dec. 6, 1990, now abandoned.

BACKGROUND OF THE INVENTION

The invention relates to a method of producing discontinuous fibers from a thermoplastic material having a high melting point (i.e. glass), and more particularly to fiber production utilizing a sizing agent specifically designed for non-continuous fibers.

In the prior art, non-continuous fibers are combined with one another to form hybrid threads or rovings, which can be manufactured at less expense than traditional continuous fibers and can be used in the composition of numerous products employed in widely diverse applications. For example, it is known to produce hybrid threads from glass fibers used to manufacture protective clothing, sealing gaskets or filter cloths because of its particularly advantageous physical and chemical properties.

Methods of the prior art include forming continuous thread fibers by forcing molten glass under centrifugal force through a number of orifices in a hollow rotating body to form thin streams of molten glass. The thin streams are mechanically drawn, and produce a large number of continuous glass filaments which are then attenuated and glued together to form a continuous thread.

French Patent 2,497,239 discloses a method for producing hybrid threads of glass and support fibers, wherein continuous glass threads are cut to lengths ranging from 10 to 100 millimeters. U.S. Pat. No. 2,706,377 discloses a method for cutting continuous threads as long as 1000 millimeters which are utilized to form hybrid threads. Cut threads can be used for varying applications depending on the characteristics of the thread, such as the diameter and length of the individual filaments.

In all continuous fiber forming operations, sizing of filaments is necessary to reduce possible damage to the resultant fiber. Sizing is a process of coating the fibers or filaments with a sizing agent to protect the surface of the filaments and the resultant thread from abrasion. Without this protection, glass fibers produced may become damaged during the various required handling operations. Sizing also ensures cohesion of the filaments, thereby acting as a gluing agent and ensuring the proper formation of the threads, while eliminating the gluing process. Depending upon the desired application, sizing is used to impart necessary properties to the thread (i.e., cohesiveness, lubrication, etc.), and can comprise largely varying ingredients. Typically, hybrid threads of the prior art have utilized conventional sizing agents such as "textile" or "plastic" sizes (usually used on continuous fibers). U.S. Pat. No. 4,584,110 describes a sizing agent specifically designed for use with cut fibers. However, this sizing agent is made of many more elements than conventional sizing agents and is therefore more difficult to produce.

SUMMARY OF THE INVENTION

In accordance with the invention, a method is disclosed for producing discontinuous fibers from thermoplastic material having a high melting point, such as glass. Molten thermoplastic material is fed to a centrifuge including a peripheral wall having a plurality of orifices. Molten material is forced through these orifices under the centrifugal force of the centrifuge and is drawn out into a multiplicity of thin molten jets. These jets are transformed into fibers wherein hot gas is utilized to transform the jets into glass fibers and the resultant fibers are collected on a conveyor belt. Additionally, the fibers are sized before they are received on the conveyor belt by a sizing agent of emulsion or suspension in water, or an aqueous solution comprising no more than three active substances. These active substances can include a lubricating agent, an antistatic agent, and sometimes an emulsifying agent. It is possible that one compound can act as both a lubricating agent and an antistatic agent. Of course, two separate compounds can be used. The active substances comprise at least 5 kg per metric ton of fibers.

One advantage of producing glass fibers in accordance with the invention is that the fibers are not glued together, but are simply entangled with one another. Therefore, it is possible to avoid or at least to facilitate a future "opening up" operation consisting of separating fibers from one another prior to blending and carding. Furthermore, it has been found that the glass fibers manufactured in accordance with the invention are well suited to combine with other fibers (i.e., support fibers) in the carding and blending process. Support fibers can comprise wool, cotton, or synthetic fibers such as polyester and polyamide.

The sizing agent described above is easier to manufacture than those of the prior art because it comprises active substances including only these elements necessary to perform blending, carding, and spinning operations. These elements are lubricating agents, antistatic agents and sometimes emulsifying agents. Additionally, the sizing agent of the invention is superior to the prior art sizing agents for these processes, not merely easier to produce.

According to a preferred embodiment of the invention, the active substances of the sizing agent include at least 50% lubricant by weight of the total size weight. This percentage may be as high as 100% for sizing agents containing a compound which acts as both a lubricant and an antistatic agent (i.e., polyglycol alcohol(s) or ester(s)). The sizing agent may comprise compounds which are used purely for lubricant action. Conventionally, these lubricating agents are chosen from the non-ionic compounds such as mineral oils, vegetable oils, cerides or waxes which can be emulsified in water by means of non-ionic emulsifiers of the alkylphenolpolyoxyethylene, polyoxyalkylene sorbitane or fatty acid amide type with a long polyoxyethylene chain. Additionally, the lubricant agents may be chosen from hydrosoluble cationic lubricants such as polyethylene wax brought into emulsion in water by a cationic emulsifier of the quaternised aliphatic amine type with a long carbonated chain or fatty amine with a long polyoxyethylene chain. The antistatic agents which are added to the lubricant agents to form sizing agents are preferably chlorides such as magnesium, lithium or an ammonium chloride, such as trimethylalkylammonium chloride.

BRIEF DESCRIPTION OF THE DRAWING

These and other objects, features and advantages of the present invention will be more readily apparent from the following Detailed Description of a Preferred Embodiment in which.

DETAILED DESCRIPTION OF A PREFERRED EMBODIMENT

Figure 1:
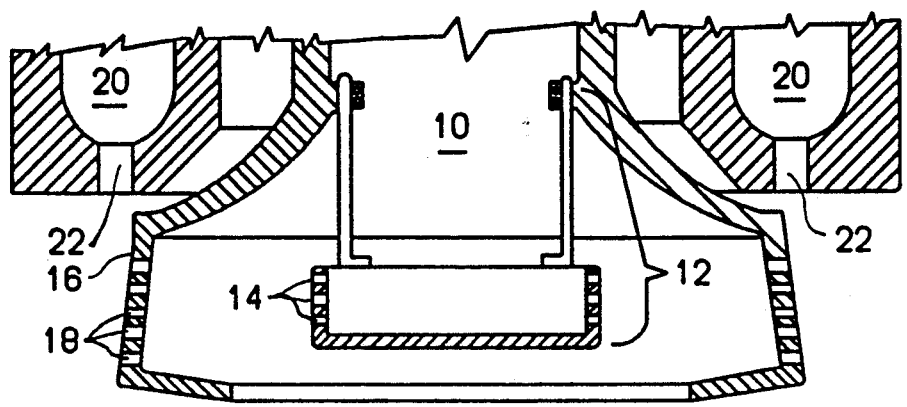
FIG. 1 is a diagrammatic view of a glass fiber producing apparatus of the prior art.

From FIG. 1, a glass fiber producing apparatus of the prior art is illustrated wherein the method of the invention can be practiced. A centrifuge 10 fixed on a rotating axial shaft (not shown) supports a cylindrically shaped basket 12. The peripheral wall of the basket 12 is provided with a plurality of wall orifices 14. The centrifuge 10 is extended by a peripheral band 16 which is provided with a plurality of band orifices 18. The diameter of these band orifices 18 decreases uniformly from the upper part of the band to its lower part. An annular combustion chamber 20 is aligned coaxially with the centrifuge wherein the base of the chamber is provided with a series of chamber orifices 22 from which jets of hot gas escape in an downwards direction.

The method of fiber formation is as follows. As the centrifuge 10 rotates, a molten material (i.e. molten glass) is projected vertically downward onto the bottom of the basket 12. This material takes the form of thin jets as it is pushed through the wall orifices 14 under the centrifugal force of the centrifuge. This process evenly distributes the molten material on the wall of the basket. Thus distributed, the molten glass jets are forced against the inside surface of the band 16 of the centrifuge (again under centrifugal force) from which they escape as multiple radial jets through the band orifices 18. These jets are immediately hit with streams of hot gas emitted from the annular combustion chamber 20 through orifices 22. The effect of the streams of hot gas is to draw out the jets in the form of fibers and to direct these fibers toward a receiving means (i.e. a conveyor) situated beneath the centrifuge. The fibers obtained from this apparatus have an average diameter of 2 $\mu$m to 10 $\mu$m.

The variation in diameter of the band orifices 18 compensates for the variations in diameter of the glass jets emanating from the belt. These variations occur because the molten jets emitted by the band orifices situated at the top of the band are subjected to a longer dose of hotter gases and greater speed than those jets situated at the bottom of the band, causing the higher glass streams to become more drawn out and hence thinner than the lower ones. Additionally, the greater jet speeds at the top can cause entanglement among the individual fibers. The decreasing orifice diameter provides for fibers of constant diameter and therefore maintains a high tensile strength among the fibers.

The apparatus comprises a collecting chamber, the wall of which serves to channel the fibers between the centrifuge and the receiving means (not shown). The glass fibers are coated with a sizing agent (described below) as they transport between the collecting chamber and the receiving means. The sizing agent is sprayed from a plurality of sources (e.g., 16) set into the wall of the collecting chamber from outside the zone defined by the fiber trajectories at this stage. The sources are distributed uniformly around the fibers and oriented approximately perpendicular to the fiber trajectories. Pumps of sizing agent provide the spray. The quantity of sizing agent to be deposited on the glass fibers depends on a variety of factors such as the concentration of active substances in the sizing agent, the agent flow rate from the centrifuge, and the number of spray devices provided. The fibers are coated with fine droplets of sizing agent and collected on the receiving means, usually comprising a perforated horizontally oriented conveyor belt. Various techniques known in the art may be used to make the fibers discontinuous. See, for example, U.S. Pat. Nos. 3,669,638, 3,823,219, and 4,433,535 which are incorporated herein by reference.

Depending on the type of apparatus utilized, various production parameters must be defined so that after the water has evaporated from the sizing agent, a quantity of substance is left on the fiber necessary to withstand the rigor of manufacture imposed on the hybrid threads or rovings. Experience shows that this quantity of active substance is in the range of 0.5 to 5% by weight relative to the weight of the glass fibers, and preferably, in the range of 1 to 3%. To obtain this desired result, it is necessary to spray an initially large quantity of size on the fibers. More particularly, an aqueous medium of sizing agent leaving approximately 1 to 5% in weight of active substances on the fibers after evaporation requires a sizing agent application generally equal to or greater than 200 kg per metric ton of fibers.

In an apparatus such as that previously described, the centrifuge is supplied with molten glass wherein the theoretical composition by weight is as follows: $SiO_2$: 64%; $Al_2O_3$: 3.5%; CaO : 7%; MgO : 3%; $Na_2O$ : 15.5%; $K_2O$ : 1.5%; $B_2O_3$ : 3%; F : 1.5%; impurities approximately 1%.

The following are two examples of a glass fiber sized according to the invention:

EXAMPLE 1

The active substances used in one example of a sizing agent comprise approximately 80% polyglycolester by weight having a chain averaging 12 carbon atoms, and approximately 20% fatty polyoxyethylene amine. The sizing agent comprises 1.95% active substance by weight, and the balance consists of demineralized water. The quantity of sizing agent sprayed averages 680 kg per metric ton of glass fibers which results in a substance coating of 1.2% by weight relative to the weight of the glass fibers.

EXAMPLE 2

Another example of a sizing agent comprises an antistatic lubricant marketed under the name NOPCO-STAT 2152-P by Messrs. HENKEL : NOPCO, in water which is an emulsion of 2.5% by weight. Again, the quantity of sizing agent sprayed averages 680 kg per ton of glass fibers, resulting in 1.5% by weight of a substance coating relative to the weight of the glass fibers.

While it is apparent that the invention herein disclosed fulfills the objects above stated, it will be appreciated that numerous embodiments an modifications may be devised by those skilled in the art, and it is intended that the appended claims cover all such modifications and embodiments as fall within the true spirit and scope of the present invention.

What is claimed is:

1. A method of producing discontinuous fibers from a glass material having an elevated melting point comprising feeding molten glass material into a centrifugal chamber, said chamber comprising a plurality of orifices wherein said molten glass material is forced therethrough forming a plurality of molten glass jets, directing hot streams of gas at said molten glass jets to form glass fibers therefrom, spraying said glass fibers with a sizing agent, said sizing agent comprising an emulsion or suspension in water, or an aqueous solution having no more than three active substances including a lubricating agent and an antistatic agent wherein the quantity of aid active substances deposited on said glass fibers after evaporation of said water in said aqueous solution is between 1 and 5 percent by weight relative to the weight of said glass fibers.

2. The method according to claim 1 wherein said sizing agent further comprises an emulsifying agent.

3. The method according to claim 2 wherein said active substances comprise a non-ionic lubricant and an antistatic agent.

4. The method according to claim 3 wherein said comprising a non-ionic emulsifier.

5. The method according to claim 2 wherein said active substances comprise a cationic lubricant and an antistatic agent.

6. The method according to claim 5 wherein said comprising a cationic emulsifier.

7. The method according to claim 1 wherein one compound acts as both said lubricating agent and said antistatic agent.

8. The method according to claim 1 wherein at least 50% of said active substances in said sizing agent comprise a lubricating agent.

9. The method according to claim 8 wherein said active substance comprises one or a plurality of compounds of esters or alcohols of polyglycol.

10. The method according to claim 1 wherein 5 kg of sizing agent is sprayed per ton of glass fibers.

* * * * *